United States Patent
Sanbongi et al.

(10) Patent No.: US 6,217,446 B1
(45) Date of Patent: Apr. 17, 2001

(54) GAME DEVICE AND PICTURE PROCESSING DEVICE

(75) Inventors: Kazutomo Sanbongi; Kouji Ohto; Takashi Oda, all of Tokyo (JP)

(73) Assignee: Kabushi Kaisha Sega Enterprises, Tokyo (JP)

(*) Notice: Subject to any disclaimer, the term of this patent is extended or adjusted under 35 U.S.C. 154(b) by 0 days.

(21) Appl. No.: 08/984,591

(22) Filed: Dec. 3, 1997

(30) Foreign Application Priority Data

Dec. 6, 1996 (JP) .................................................... 8-327396

(51) Int. Cl.⁷ .............................. A63F 13/00; A63F 9/24; G06F 17/00; G06F 19/00
(52) U.S. Cl. .................................... 463/7; 463/8; 463/31; 463/37; 463/43; 463/50; 463/51; 463/56; 345/419; 345/427; 434/27; 434/44
(58) Field of Search .................................. 463/7, 8, 9, 37, 463/31, 43, 44, 46, 47, 49, 50, 57, 52, 53, 54, 56, 51; 345/427, 474, 473, 952, 958, 959, 419; 434/27, 44, 308, 365, 43, 38, 68

(56) References Cited

U.S. PATENT DOCUMENTS

| | | | |
|---|---|---|---|
| 4,597,741 | * 7/1986 | Stickel | 434/27 X |
| 4,714,428 | * 12/1987 | Bunker et al. | 434/43 X |
| 5,338,200 | * 8/1994 | Olive | 434/43 X |
| 5,435,725 | * 7/1995 | Ikeuchi | 434/30 X |
| 5,454,720 | * 10/1995 | FitzGerald et al. | 434/27 X |
| 5,577,960 | * 11/1996 | Sasaki | 463/32 |
| 5,583,975 | * 12/1996 | Naka et al. | 395/126 X |
| 5,586,231 | * 12/1996 | Florent et al. | 395/125 X |
| 5,641,288 | * 6/1997 | Zaenglein, Jr. | 434/21 X |
| 5,714,997 | * 2/1998 | Anderson | 348/39 |
| 5,736,982 | * 4/1998 | Suzuki et al. | 345/330 |
| 5,742,521 | * 4/1998 | Ellenby et al. | 702/127 |
| 5,764,241 | * 6/1998 | Elliott et al. | 345/473 X |
| 5,766,079 | * 6/1998 | Kataoka et al. | 463/36 |
| 5,769,718 | * 6/1998 | Rieder | 463/31 |
| 5,779,548 | * 7/1998 | Asai et al. | 463/31 X |
| 5,793,310 | * 8/1998 | Watanabe et al. | 340/995 |
| 5,815,411 | * 9/1998 | Ellenby et al. | 702/150 |
| 5,850,352 | * 12/1998 | Moezzi et al. | 348/13 |
| 5,880,709 | * 3/1999 | Itai et al. | 345/113 X |
| 5,880,731 | * 3/1999 | Liles et al. | 345/349 |
| 5,938,530 | * 8/1999 | Watanabe | 463/31 X |

* cited by examiner

*Primary Examiner*—Valencia Martin-Wallace
*Assistant Examiner*—Binh-An D. Nguyen
(74) *Attorney, Agent, or Firm*—Fish & Richardson, PC

(57) ABSTRACT

A device for proceeding a game in correspondence with the game scores. The game device (10) enables game play by moving a viewpoint arranged inside a three-dimensional virtual space, and comprises a storing unit (102) for storing a plurality of movement courses of the viewpoint branching off from a certain scene in the three-dimensional virtual space, together with the conditions for such branch-off, a picture processing unit (108–116) for performing data processing (101) to form pictures in accordance with the operation signals from an operating unit through the implementation of algorithms, and for performing picture conversion to form the image viewed from such viewpoint, and a course selecting unit (101) for selecting the movement course corresponding to the game score from among said plurality of viewpoint movement courses, and for moving the viewpoint along such selected movement course.

26 Claims, 11 Drawing Sheets

GAME DEVICE AND PICTURE PROCESSING DEVICE

BACKGROUND OF THE INVENTION

1. Field of the Invention

The present invention generally relates to picture processing devices, and particularly to game machines.

2. Related Art

In recent years, numerous picture images processing devices of the type called three-dimensional game machines are being proposed. These picture processing devices define various characters within a virtual space formed by a computer, and at the same time, realize picture processing such as moving characters by taking in operational information from the game player via peripheral equipment such as joysticks.

The results of this picture processing are shown to the player via a television monitor as an image seen from a viewpoint called a virtual camera, which is arranged inside a three-dimensional virtual space.

One example of this type of picture processing device is a game device which competes in who is superior in shooting down characters indicated on a screen (for example, "Virtua Cop" by Sega Enterprises, Ltd.). This game device is structured so that while a virtual camera moves along a predetermined course inside a three-dimensional space, specific characters are shown in zoom, or identification marks are placed around a character to enable the game player to more easily recognize the character to be attacked.

In this game device, a game player pulls the trigger of a model gun pointed toward the screen, and an integrated sensor unit of the model gun detects the scan lines of the screen. By calculating the time up to the detection of the scan lines, it is judged whether any character has been hit.

SUMMARY OF THE INVENTION

However, this kind of picture processing device has the following problems.

First, the course within the virtual space along which the virtual camera moves is predetermined, and no consideration is made to diversify the courses of movement of the virtual camera. On the other hand, there are also game devices which indicate vehicles and the like on the screen to let the player select courses as appropriate to cause the virtual camera to proceed along this course (e.g., "Rail Chase 2" by Sega Enterprises, Ltd.), but this game device is dependent on the player's will, and no consideration is made for reflecting the game score, such as the superiority in shooting (or attacking) characters, in the selection of the course.

Second, conventional game devices take no consideration for effecting a dramatic appearance and movements of the characters to the player when moving a large number of characters (to be shot) toward the player. When trying to raise the quality or degree of amusement of the game and therefor make many characters merely appear or move within the virtual space, the difficulty grade of the game rises and thus becomes difficult to realize an amusing game.

Third, conventional game devices give no consideration to setting the virtual camera's viewpoint such that the characters are indicated in their most effective way when indicating a large umber of characters. Failing this effective setting of the viewpoint, the player will be provided with no dramatic image when making a plurality of characters appear and making these characters move.

In order to achieve the purposes above, the game device relating to the present invention is a game device for playing a game under movement of the viewpoint arranged in a three-dimensional virtual space, comprising storing means for storing a plurality of movement courses of the viewpoint which branch off from a certain scene in said three-dimensional virtual space, together with the conditions for such branch-off; picture processing means for performing data processing to form pictures by implementing the game algorithms corresponding to the operation signals from an operating means, and for performing picture conversion to form the image viewed from said viewpoint, and course selecting means for selecting a movement course corresponding to the game scores from among said plurality of viewpoint movement courses, and for moving said viewpoint along the selected movement course.

Through this structure, it is possible to proceed the game corresponding to the player's level of technique.

Furthermore, the device is characterized in that the above picture processing means implements a game algorithm which simulates a fight between a plurality of characters defined within the three-dimensional virtual space and the player, and the course selecting means determines the next movement course to advance to depending upon whether the player has won the fight with a certain character among the plurality of characters. Thereby, the game becomes amusing because the game proceeding is selected corresponding to the level (i.e. the strength or type) of the opponent in the fight.

By arranging the plurality of characters among multiple zones and defining the attacking ability for each character in the zone for each zone, it is possible to make the player enjoy the game by adjusting the game's difficulty grade.

Furthermore, by causing characters appear with preference in zones further away from the viewpoint among the multiple zones, it is possible to prevent the game from becoming difficult due to enemies suddenly appearing near the camera.

By limiting the number of characters to be arranged inside each zone, it is possible to prevent the difficulty grade of the fight from being high.

The picture processing device according to the present invention moves a virtual camera inside a three-dimensional virtual space wherein a plurality of movable enemy characters have been arranged. It provides the playing of a game in which the player and said enemy characters fight on a picture from said virtual camera. The area in which said player and said plurality of enemy characters fight is divided in multiple zones, and the number of enemy characters which may exist inside the zone nearest said virtual camera is limited.

Through this structure, it is possible to limit the number of enemy characters that attack, and to suppress an increase in the calculation of the picture processing. It is also possible to prevent the difficulty grade of the game from becoming high in a shooting game device.

The picture processing device according to the present invention is a picture processing device in which a virtual camera is directed towards a plurality of characters arranged inside a three-dimensional virtual space. The gaze point of said virtual camera is preferentially gazed on the character nearer to the virtual camera, and if a plurality of characters exist with the same preference, the gaze point is set to an intermediate position between these characters.

This structure is preferable in that a screen can be obtained in which the characters are easily viewable. Especially in the screen of fighting games, it is preferable because the opponent can be seen well.

The picture processing device according to the present invention is a picture processing device which controls the gaze point movement of the virtual camera in corresponding with the angle of deviation between the current position of the character arranged inside the three-dimensional virtual space and the target position to which the character is to move. The next movement position of said gaze point is set in corresponding with the value of said deviation angle.

This structure is preferable in that the camera gaze point can move smoothly in spite of sudden movements of the character.

Further, as the succeeding distance of movement of said gaze point is determined by a function having said angle of deviation as its variable, it is possible to set the way of movement of the gaze point according thereto, which is preferable.

The above succeeding distance of movement of said gaze point is preferably determined as the minimum value if the deviation angle value is in a low range, as the maximum value if the deviation angle is in a high range, and as the value proportional to the deviation angle if the deviation angle is in a range between these two ranges. Thereby, a certain degree of movement range can be secured and the gaze point can be placed at the target position of the character's movement in a predetermined period of time, even with small deviation angles. Furthermore, it becomes possible to secure smooth camera work by making the movement range not too large. It is also possible to move the gaze point rapidly corresponding to the deviation angle in the intermediate range.

The game device according to the present invention moves a viewpoint arranged inside a three-dimensional virtual space, and simulates fights between a moving character arranged inside said space and the player. When a predetermined number of attacks or more have been performed by the player against a predetermined character, the shot character is considered to be dead, and eliminated from the characters to be attacked. This game device comprises storing means for storing a plurality of movement courses of the viewpoint which branch off from a certain scene in said three-dimensional virtual space together with the conditions for such branch-off; picture processing means for performing data processing to form pictures corresponding to the operation signals from an operating means, and for performing picture conversion to form the image viewed from said viewpoint; and course selecting means for selecting a predetermined movement course according to said characters which have not been considered to be dead from among said plurality of viewpoint movement courses, and for moving said viewpoint along the selected movement course.

By providing this structure, it is possible to perform the course selection in correspondence with the player's techniques.

The game device according to the present invention moves a virtual camera (viewpoint) inside a three-dimensional virtual space wherein a plurality of movable enemy characters (objects) have been arranged. It is a game device wherein the player and said enemy characters fight (e.g. shooting) on a picture from said virtual camera. It comprises gaze character determining means for determining the enemy character to be gazed by said virtual camera based on the distances between said virtual camera and each of said plurality of enemy characters; and gaze point adjusting means for focusing the gaze point of said virtual camera upon the determined enemy character.

This structure enables the determination of the enemy character on which the camera focuses in correspondence with the distance, so that the player's attention can be attracted to such enemy. Especially by attracting attention to the nearest enemy character, it is possible to inform the player which enemy is most dangerous, and to lower the difficulty grade of the game. On the other hand, it is also possible to confuse the player by attracting attention to a distance enemy and raise the difficulty grade of the game.

The game device may further comprise movement controlling means for controlling the movement mode of the gaze point of said virtual camera in correspondence with the distance between the present virtual camera gaze point and said determined enemy character during the movement of said virtual camera gaze point, and thereby move the gaze point while maintaining the screen in an easily viewable state.

The game device according to the present invention moves a virtual camera arranged inside a three-dimensional virtual space. It stimulates fights between a plurality of movable characters arranged inside said space and the player. When a predetermined number of attacks or more have been performed by the player against a predetermined character, the attacked character is considered to be dead, and eliminated from the enemy characters to be attacked. The strength of each of said plurality of enemy characters is defined with regard to the degree of resistance against said attacks. The game device according to the resent invention comprises controlling means for performing control to move the gaze point of said virtual camera to follow said enemy character which has not been simulated dead in spite of said simulated attacks.

Through this structure, it is possible to make the camera follow a surviving enemy character and connect a certain shooting scene with the next shooting scene in a natural way.

The game device according to the present invention moves a virtual camera arranged inside a three-dimensional virtual space and simulates fights between a plurality of movable enemy characters arranged inside said space and the player. When a predetermined number of attacks or more have been performed by the player against a predetermined enemy character, said enemy character is considered dead, and eliminated from the characters to be attacked. The strength of each of said plurality of enemy characters is defined with regard to the degree of resistance against said attacks, and which comprises a character movement controlling means for moving said enemy character which has not been considered to be dead in spite of said attacks to move towards said virtual camera.

This structure enables the realization of enemies (for example, zombies) which come nearer and nearer toward the camera in spite of being shot many times, which increases the player's sense of fear.

The information storage medium according to the present invention stores a program to cause a computer system to operate as the game device or picture processing device described above.

PREFERRED EMBODIMENTS

Figure 1:
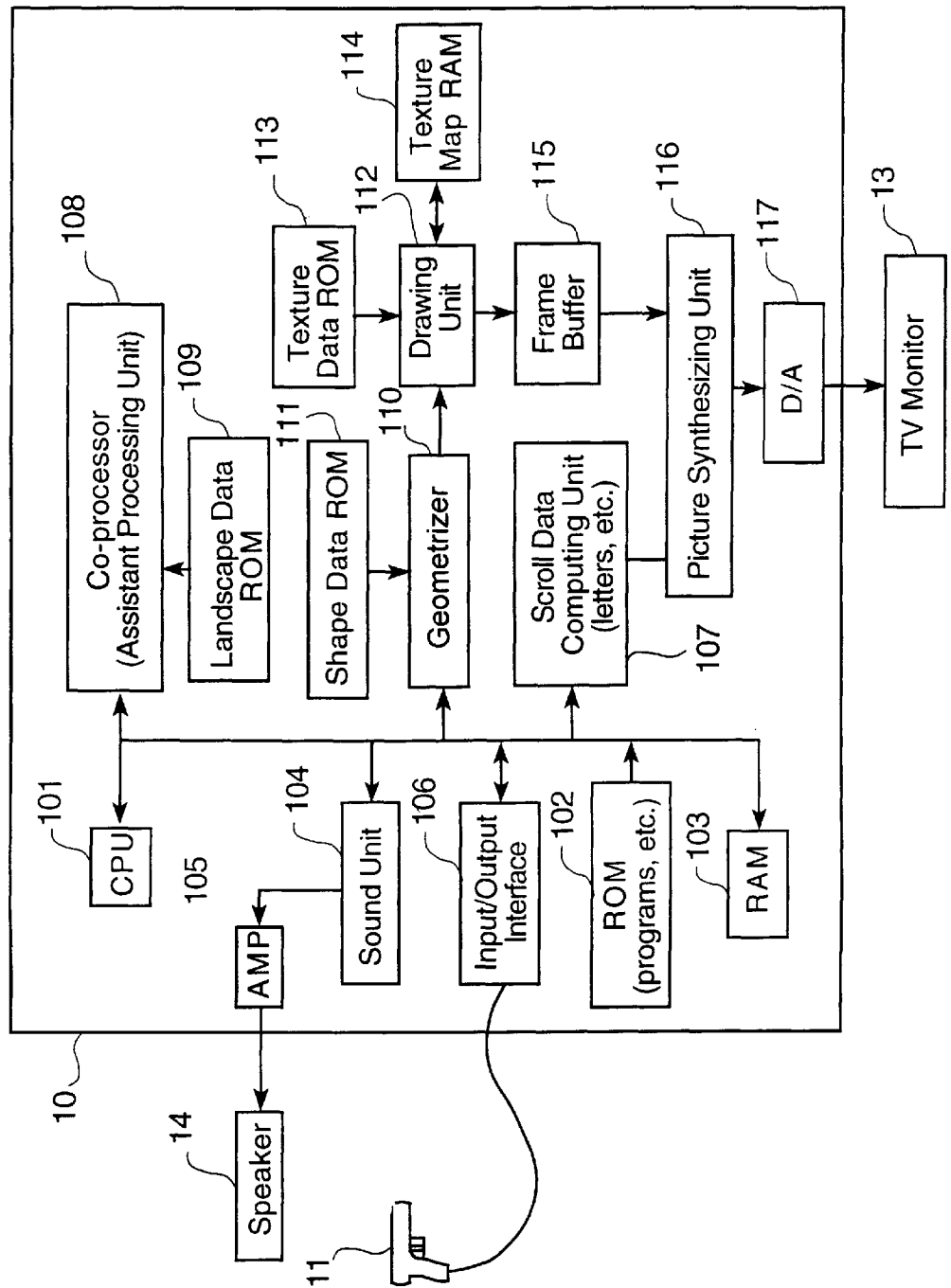
FIG. 1 is a block schematic view of the game device relating to one embodiment of the present invention.

Now, an embodiment of the present invention will be explained in reference to the drawings. FIG. 1 is a block view showing one embodiment of the game device of an arcade game type gun shooting game relating to the present invention. This game device comprises as its basic elements a game device body 10, an input device 11, a TV monitor 13 and a speaker 14.

The input device 11 is a simulated weapon for use with shooting games, such as pistols, machine guns, rifles, etc. (hereinafter explained with a pistol) for shooting an enemy appearing in a game. The pistol includes a light-intercepting element (photoreceptor) which reads the scanned spot (light spot of an electronic beam) of the location of impact on the TV monitor, and a trigger switch which activates in correspondence with the trigger operation of the gun. The signals of the detected timing of the scanned spot and of the trigger timing are sent via a connection code to an interface 106 which will be described below. TV monitor 13 is for indicating the game proceeding state as a picture, and a projector may be used instead of the TV monitor.

Game device body 10 has a CPU (Central Processing Unit) 101, and further comprises a ROM 102, a RAM 103, a sound unit 104, an input/output interface 106, a scroll data processing unit 107, a co-processor (assistance processing unit) 108, a topographical data ROM 109, a geometrizer 110, a shape data ROM 111, a drawing unit 112, a texture data ROM 113, a texture map RAM 114, a frame buffer 115, a picture synthesizing unit 116, and a D/A converter 117. The storage medium of the present invention, namely the ROM 102 above, may include a hard disc, a cartridge-type ROM, a CD-ROM and various other publicly known media, and may also include communication media (internet, various personal computer networks).

The CPU 101 is connected via bus lines to the ROM 102 which stores predetermined programs, etc., the RAM 103 which stores data, the sound unit 104, the input/output interface 106, the scroll data computing unit 107, the co-processor 108, and the geometrizer 110. The RAM 103 serves for use as a buffer, and various commands are written into the geometrizer 110 (indication of objects, etc.), and writing into the matrix for the coordinate conversion matrix calculation is performed.

Input/output interface 106 is connected to said input unit 11 (pistol). From the detected signal of the scanned spot of pistol 11, the trigger signal which shows that the trigger of the pistol has been pulled, the position of the present coordinates (X, Y) of the scanning electronic beam on the TV monitor and the target position, it is determined whether the gun has been fired, where the bullet has hit, and the number of shots, etc., and the various types of corresponding flags are set at predetermined locations inside the RAM 103.

The sound unit 104 is connected to the speaker 14 via a power amplifier 105, and the sound signal generated by the sound unit 104 is amplified and given to the speaker 14.

In the present embodiment, the CPU 101 reads the game story proceedings based on the program installed inside the ROM 102, the landscape data from the ROM 109, or the shape data from the shape data ROM 111 (three dimensional data such as "enemy characters and other objects," and "game backgrounds, such as landscape, building, interior, and underground tunnels"), and sets the situation of the three dimensional virtual space, and performs the shooting processing corresponding to the trigger signal from the input device 11, etc.

The coordinate values in the three dimensional space for the various types of objects inside the virtual game space are determined. Thereafter, the conversion matrix for converting these coordinate values to the coordinate system of the range of view, and the shape data (buildings, landscape, interior, research room, furniture, etc.) are input into the geometrizer 110. The landscape data ROM 109 is connected to the co-processor 108, so that the landscape data for the determined camera routes, etc. are given to the co-processor 108 (and the CPU 101). Furthermore, the co-processor 108 performs the control and calculation, etc. for determining the hit rate of the shooting, the deviation between the camera eye and the object, and the movements of the eye etc., and mainly takes over the floating point calculation during these determinations or calculations. As a result, the co-processor 108 performs the hit determination of the shooting of the objects or the calculation of the position of the camera eye against the arrangement of the object, and the results are given to the CPU 101. Furthermore, the hit determination algorithm may use a publicly known technique such as Japanese Patent Laid-Open Hei 8(1996)-36651.

The geometrizer 110 is connected to the shape data ROM 111 and the drawing unit 112. The shape data of polygons (three-dimensional data such as buildings, walls, halls, interior, landscape, background, main character, friends, a plurality of enemy types (e.g. zombies), etc., made of each of the vertices) are stored in advance in the shape data ROM 111, and these shape data are given to the geometrizer 110. The geometrizer 110 perspectively converts the shape data designated by the conversion matrix which is sent from the CPU 101, and obtains the data converted from the coordinate system to the perspective coordinate system inside the three-dimensional virtual space.

The drawing device 112 pastes the texture onto the shape data of the converted perspective coordinate system, and outputs such data to the buffer 115. In order to perform this texture pasting, the drawing device 112 is connected to the texture data ROM 113 and the texture map RAM 114, and also to the frame buffer 115. Polygon data means a data group with relative or absolute coordinates of the vertices of a polygon (mainly triangles or quadrangles) made of a collection of a plurality of vertices. The above landscape data ROM 109 stores for the camera to move within the virtual space in accordance with the game story. In contrast, the shape data ROM 111 stores polygon data set more accurately with regard to the shapes constituting the screen, such as the enemies and background.

The scroll data computing device 107 calculates the data of the scroll screen, such as the letters, and this computing device 107 and said frame buffer 115 are connected to a TV monitor 13 via the picture synthesizing device 116 and the D/A converter 117. Thereby, the objects (enemies), landscape (background) and other polygon screens (simulation results) stored temporarily in the frame buffer 115 are synthesized with the scroll screen of other literal information (e.g., life count value, damage points of the player, etc.) in accordance with the designated priority, thereby generating the final frame picture data. These picture data are converted into analog signals with the D/A converter 117 and sent to the TV monitor 13, and the shooting game picture is indicated in real time.

Figure 2:
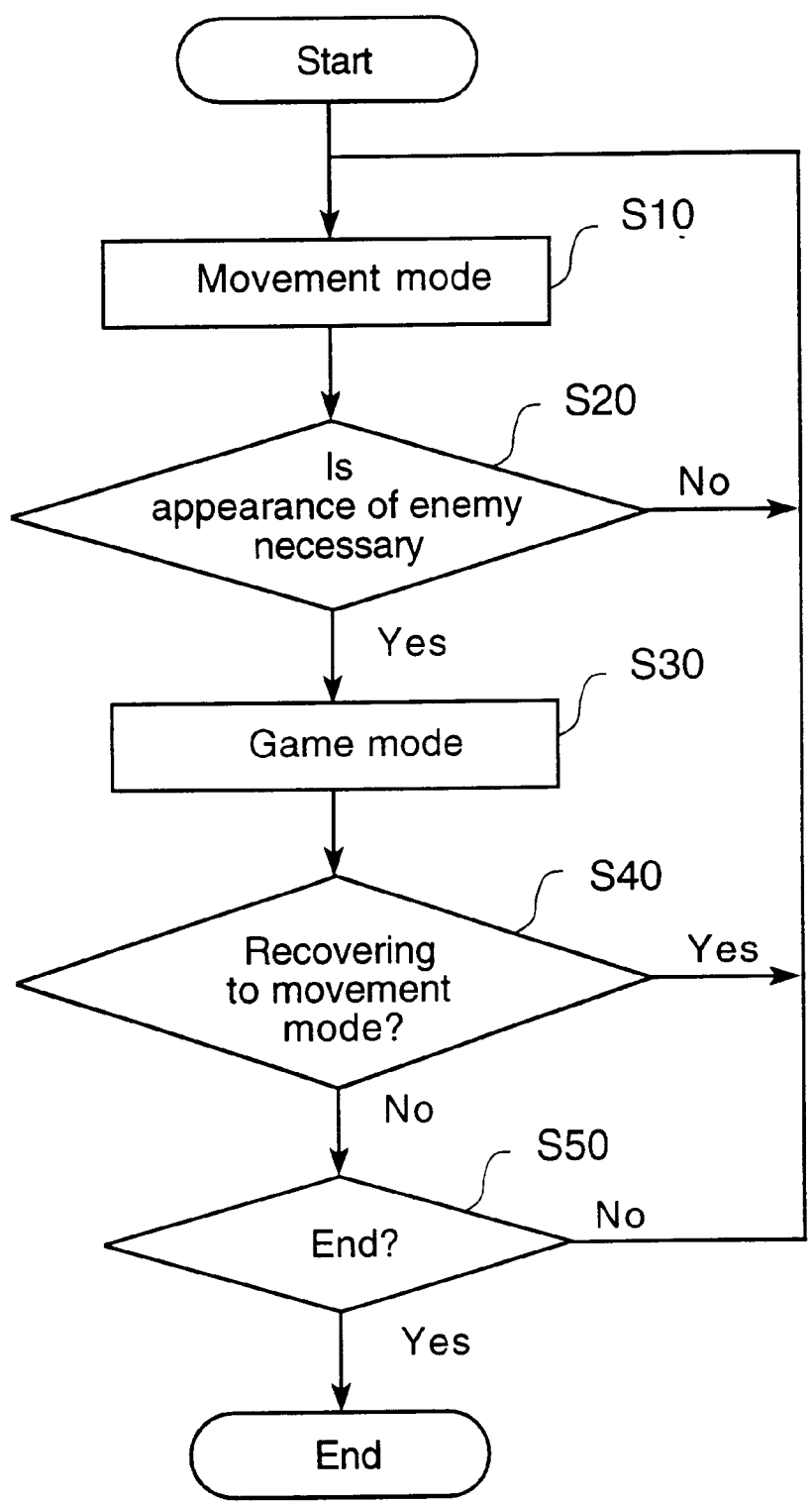
FIG. 2 is a flowchart schematically describing the general processing of the CPU of the embodiment above.

Next, the overall game flow will be explained with reference to FIG. 2. This figure is a flow chart which explains the game in outline, and is roughly divided in the movement mode and the game mode. In the movement mode (S10), the virtual camera moves within a virtual game spaced formed inside the computer system in accordance with a pre-programmed game story, and various situations are projected on the screen.

When meeting an enemy during movement (S20), the computer changes to the game mode which proceeds a shooting game (S30). When an enemy is shot down, the camera is moved and the game can be in transition to another situation (S40; Yes), and the game can be further proceeded (S10–S30). If the enemy cannot be shot down and the hero is defected by the enemy or has cleared the last game (S40; No), the game is determined as over. For example, if the damage to the hero is minor (S50; No), it is possible to go back to the game mode of another situation (S10–S30) or the game mode in which the hero was defeated. When the time set for a game section is up, or when the game parameters such as the damage values fulfill the game finalization conditions, the game ends (S50; Yes).

Now, the improvements to the game proceedment inside the virtual game space (camera movement) will be explained.

In conventional games, the decision in course selection at the branching point of a course was made at the choice of the player. For example, in the above-described "Rail Chase 2," the player merely shoots at a sign, and the course selection was due to the judgment results of whether the shot hit the target or not. In contrast, in the present embodiment, the difficulty grade of the next game proceeding or various courses with additional character appearances can be selected in correspondence with the shooting scores with regard to a plurality of characters (enemies), which characters have been shot, and other information obtained from the game proceedings (game score, preferred characters of the player, etc.).

Figure 3:
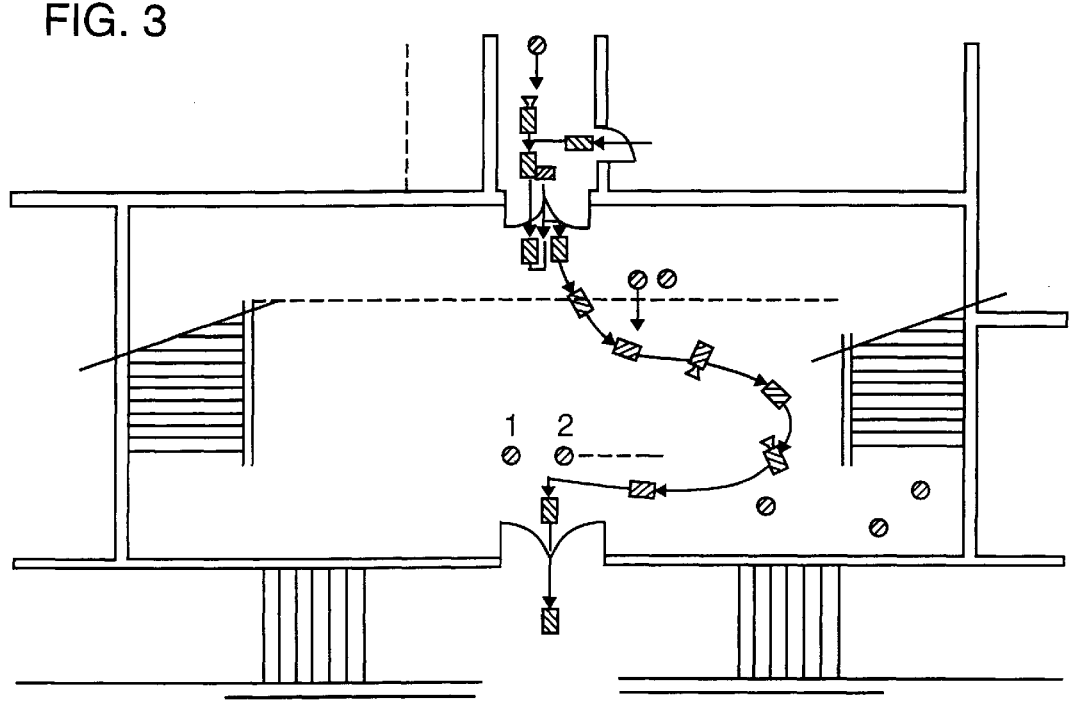
FIG. 3 is an explanatory view describing an example of the course selection.
Figure 4:
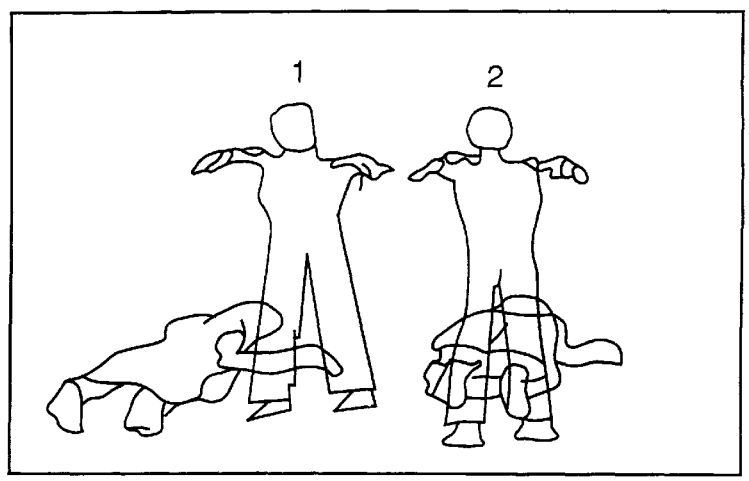
FIG. 4 is an explanatory view describing an example of a character (enemy) in the game.

FIG. 3 is an explanatory view showing an example of how to move inside a building with enemies inside, and how to proceed by shooting the enemies down. In this figure, the enemy is encircled, and the direction of view is indicated by the direction of the camera. The camera corresponds to the viewpoint of the player. When the camera enters the building entrance arranged in the three-dimensional virtual space, enemy 1 and enemy 2 are present in the hall of the ground floor. These enemies are so-called zombies, and, as shown in FIG. 4, corpses which had been lying down stand up and attack the player. In this position, the player shoots down the enemies. Enemy 1 and enemy 2 differ in strength. Enemy 1 can be shot down with comparatively few shots. Enemy 2 is strong and can only be shot down with many target shots. Furthermore, enemies 1 and 2 each have several weak points, and damage degrees have been set for each weak point. When a weak point is hit, the damage point is added, and when the points exceed a predetermined value, the shot enemy falls down. If the enemy is not shot down within a predetermined period of time, the enemy attacks and the damage points of the player increase. The damage points of the player increases and decreases with the game proceedings.

In other words, the following is meant. In accordance with the enemy type, each of the enemies has the strength to resist simulated attacks to its head, body, hands, and legs, etc. (hit points). These strong points can be set as appropriate at one or more locations, and the strength of each portion is variable. Shots hitting each of the portions cause damage points to be subtracted from the strength. The total remaining strength at each of the portions is calculated, and when this exceeds a predetermined value, this enemy can be treated as simulated dead. Furthermore, when the strength value of a certain portion is at a predetermined value or less, it is possible to perform picture processing to separate this strength value can be set in various ways, it is possible to provide diversity so that shots hitting a certain enemy many times will not be able to shoot down the enemy (simulated death), but on the other hand, a certain enemy will fall down easily, etc. It is also possible to realize diversity by increasing the damage points for hitting the head portion and decreasing the damage points for hitting other locations.

Such a game score is a condition for branch-off when a movement course of the camera (viewpoint) is selected from a plurality of movement courses of the camera. The conditions for branch-off have been stored in a ROM 102 together with a plurality of movement courses.

In the present game example, the game score is a quantitative representation of the player's shooting abilities depending upon what type of enemy the player has hot down within a predetermined period of time, and/or how many enemies have been shot down. Other game examples define the game score in accordance with the game's rules.

When the player conquers a strong enemy 2 at the first barrier, a first floor course requiring greater shooting abilities or prompt judgments, etc. is selected, and the camera moves to the right direction. In other words, when enemy 1 does not fall down (enemy 1 did not die), this course is proceeded. In this course, for example, an enemy on the second floor crosses the bannister and attacks. When the player opens the door at the end of the first floor hall, the player confronts an enemy. The player proceeds by conquering these enemies.

Figure 5:
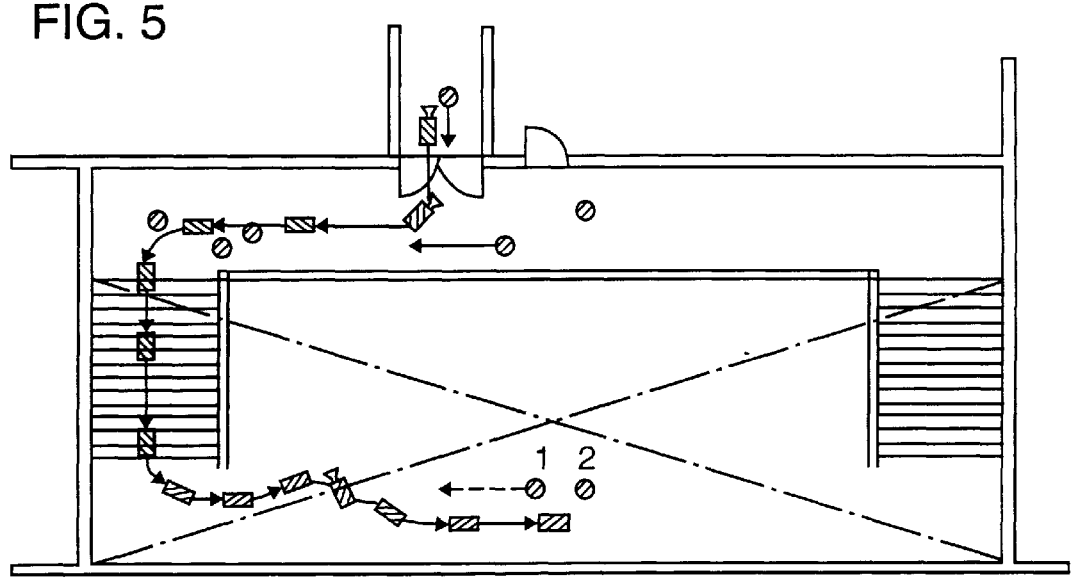
FIG. 5 is an explanatory view describing an example of the course selection.

When the player conquers enemy 1 at the first barrier, a comparatively easy second floor course is selected as shown in FIG. 5. In this course, the player proceeds to approach visible enemies, so that it is easier to shoot. When the player has become used to shooting and opens the second floor door, the player is confronted with an enemy.

As mentioned above, the movement course of the camera is selected from a plurality of camera movement courses in correspondence with the game score by CPU 101 as a course selecting means. And the CPU 101 makes the camera move along the selected course.

In this example, the present invention was explained by using two selected courses, but it is possible to select various courses in accordance with the game scores or player's preference. This allows the player's abilities based on which enemies he did or did not shoot down, or the game score, to be reflected in the course selection. In other words, it becomes possible to differentiate various grades of difficulty in the course selection in accordance with the player's abilities.

Next, the improvements in the game mode will be explained. During the movement mode, the camera proceeds along a predetermined track at a predetermined position and angle. When an enemy appears, the game switches to the game mode.

Figure 6:
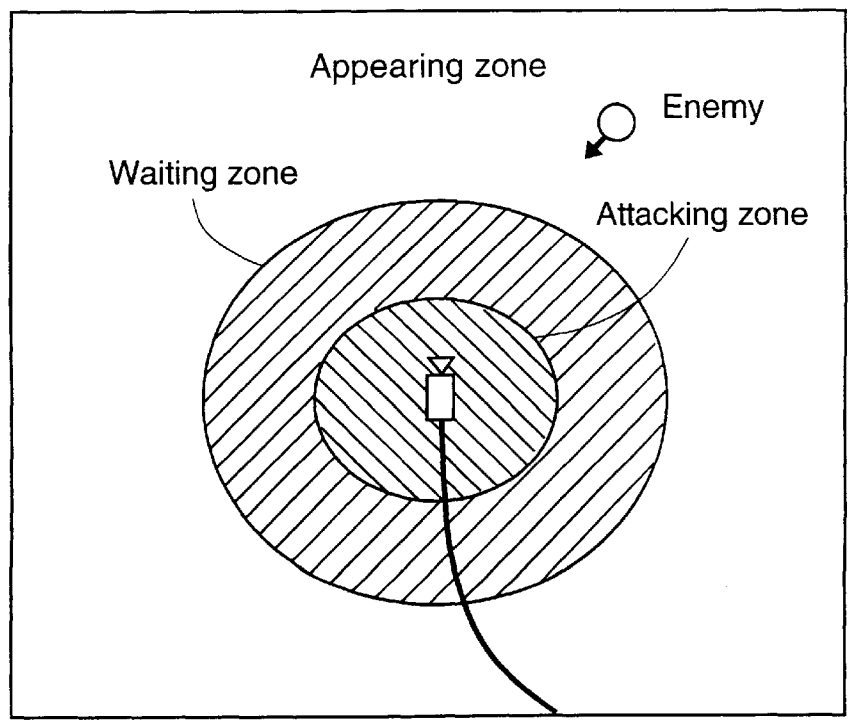
FIG. 6 is an explanatory view describing an example of the zoning in a game fight.

As shown in FIG. 6, in the game mode, the area where the shooting is performed is classified in three zones, namely the attacking zone, the waiting zone, and the appearing zone which center around the camera location. Each zone is classified according to the distance from the camera location. When an enemy in the attacking zone is shot down, the enemy in the waiting zone moves to the attacking zone and attacks the player. An enemy appears in the appearing zone and moves to the waiting zone. Then the number of enemies in the waiting zone and the attacking zone, respectively, are limited to a fixed number in accordance with the difficulty grade of the game scene. The number of enemies in the appearing zone are not particularly limited.

Figures 7, 8A, 8B:
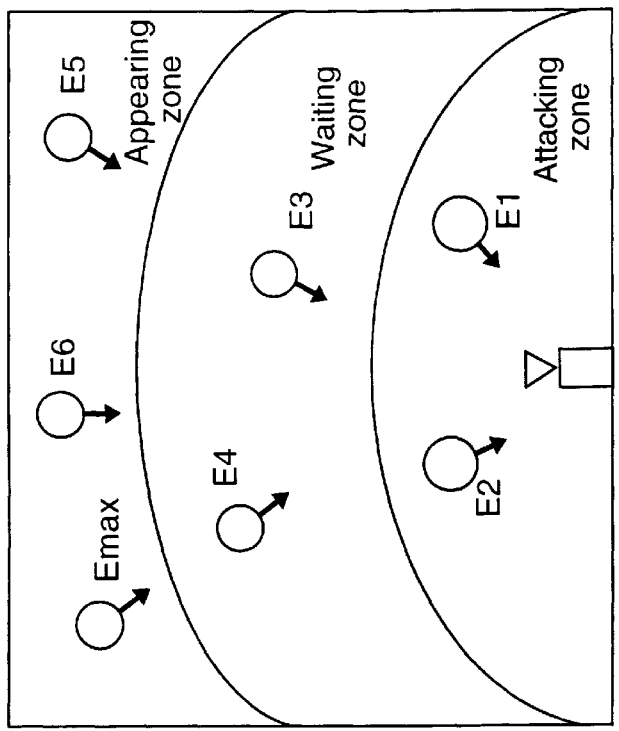
FIG. 7 is an explanatory view describing an example of the arrangement of characters in each zone.
FIG. 8(a) is an explanatory view describing a flag arrangement showing the existence of characters.
FIG. 8(b) is an explanatory view describing the flags which show whether the characters are in an attacking state.

For example, as shown in FIG. 7, the number of enemies may be set to a maximum of 2 in the waiting zone and to a maximum of 2 in the attacking zone. In this figure, the enemies are expressed by E1-EMAX in the direction going away from the player. The number of enemies is programmed in advance in correspondence with the game scene. The arrows in the figure show the directions along which the enemies proceed. An enemy appearing in the appearing zone proceeds in the direction of the camera, but if there are two enemies in the waiting zone, the appearing enemy waits outside the waiting zone. When a vacancy occurs in the waiting zone, the enemy in the appearing zone proceeds to the waiting zone. The enemy in the waiting zone proceeds towards the camera, but if there are two enemies in the attacking zone, the waiting enemy waits outside the attacking zone. When a vacancy occurs in the attacking zone, the waiting enemy proceeds to the attacking zone. The enemy in the attacking zone proceeds towards the camera, and when it has neared the camera to a certain distance, the enemy attacks the player. As described above, limiting the number of enemies in the zone near the camera prevents the number of enemies from increasing and causing the difficulty grade of the game to increase, thereby alleviating the player's burden.

An enemy flag arrangement E[n] has been prepared in order to clarify where the enemy is at the present time. FIG. 8(*a*) shows this state, and whether an enemy exists at E[n] is shown by the flag value. In other words, it is shown that if the flag value is "1", an enemy exists, and if "0", no enemy exists. Corresponding to the flag arrangement E[n], an enemy character is arranged inside the virtual space, and its movements and other factors are controlled through routines which are not illustrated. Furthermore, as shown in FIG. 8(*b*), an attack flag A[n] has also been prepared for showing whether the enemy in the attacking area is in an attacking state. If flag A[n] is "1", it shows an attacking state, and "0" shows a non-attacking state. Each of the enemies are further identified by ID numbers in the direction going further away from the camera position.

Figure 9:
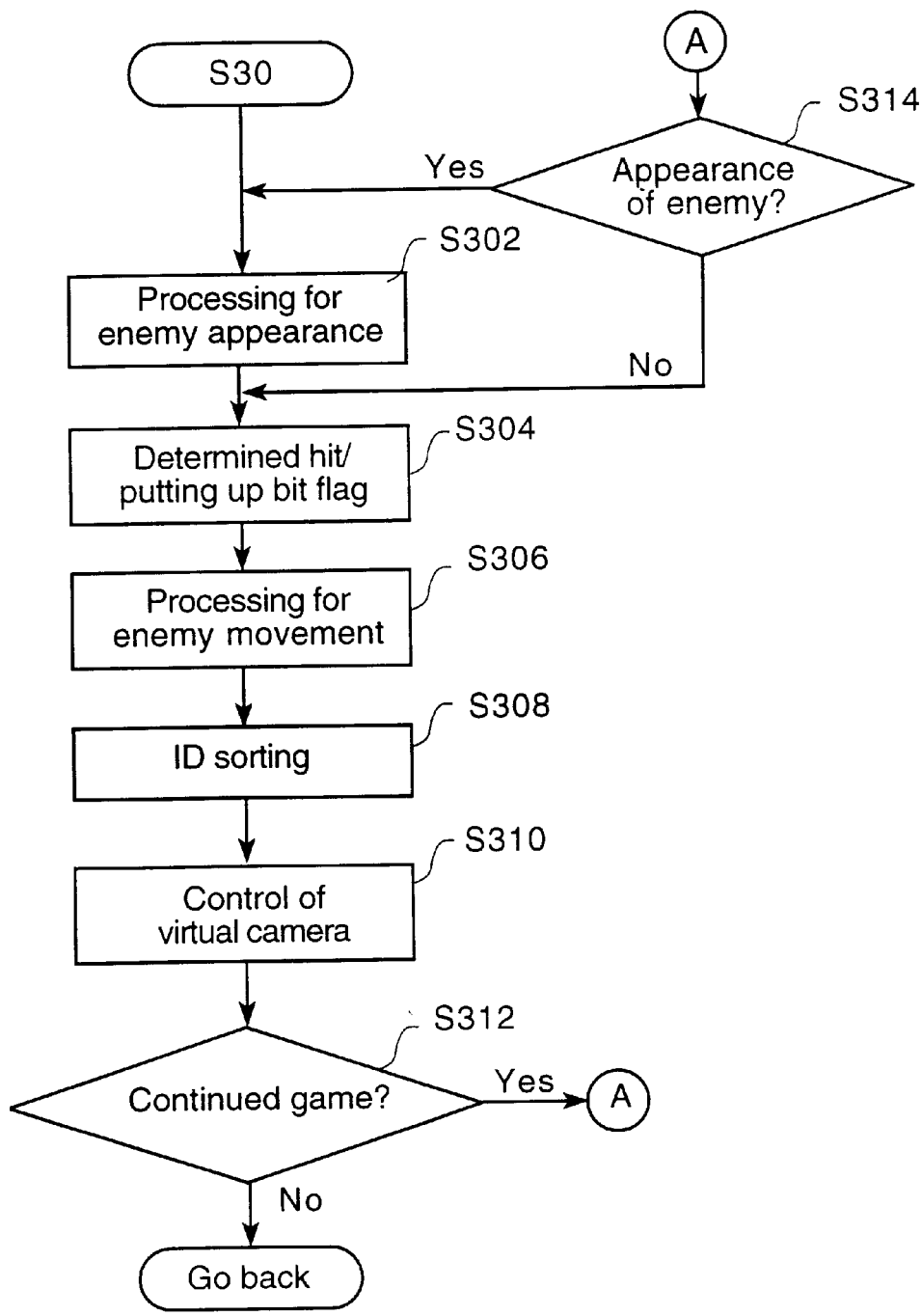
FIG. 9 is a flow chart explaining the proceeding sequence in the game mode.

FIG. 9 is a flow chart explaining the processes in the game mode (S30). When the camera meets an enemy during its movement inside the virtual space, the process of making enemies of the type and number as programmed in advance for such scene is performed. Concrete examples of this process (FIG. 10) will be explained later (S302). The player may shoot at the appearing enemy. The results thereof are evaluated, and the enemy to be shot down and extinguished will be marked with a hit flag (S304). The movement processing of the enemy is performed for proceeding the back enemy to the vacant position or the position of the extinguished enemy. This process will be explained hereafter by reference to FIG. 11 (S306). The IDs of the enemies inside the area are sorted in the world coordinate system so as to increase the ID numbers in the direction going away from the camera. In other words, the flags and IDs from E[3] onwards (including enemies which are not indicated on the screen) are sorted in the sequence going away from the camera for every cycle of the routine (1/60 seconds), (S308). The direction of the virtual camera (direction of view) is set so as to enable the player to easily see the positioning or attacking the state of the enemies. This way of adjusting the direction will be explained hereafter by reference to FIG. 1 (S310).

Thereafter, it is determined whether or not the game will be continued. If there are enemies remaining or the fight has not ended (S312; Yes), then it is determined based on the game story program whether an enemy should appear (S314). If an enemy should appear (S314; Yes), an enemy appears (S302). If an enemy should not appear (S302; No), the CPU proceeds to the determination of the shooting results regarding the remaining enemies (S304), and Step 306 to Step 310 are repeated. If game over is determined (S312; No), the CPU goes back to Step 40 described above. Then, it is determined whether to go back to the transfer mode for proceeding to the next game scene (S40), or whether the game is over or not (S50).

Figure 10:
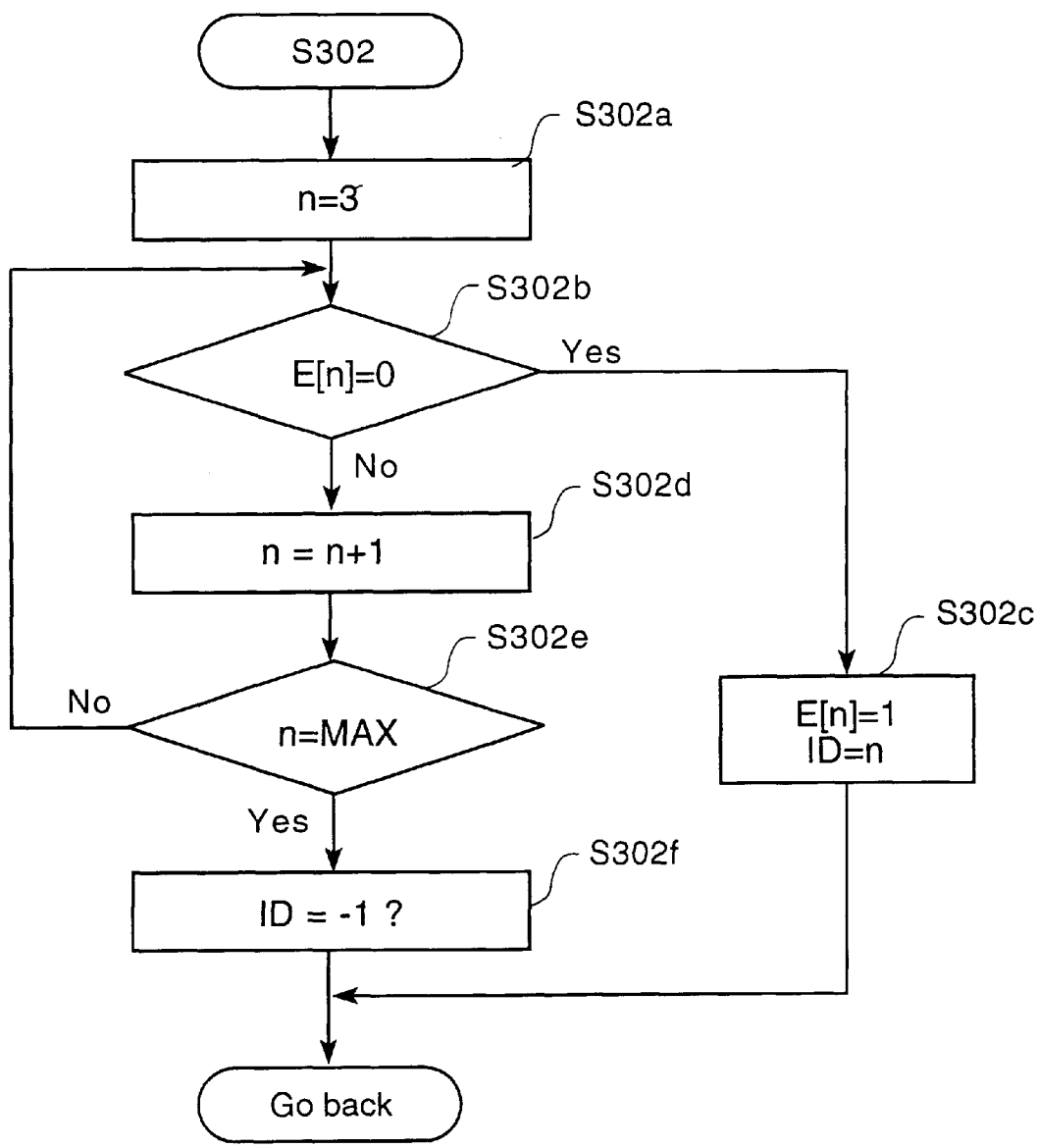
FIG. 10 is a flow chart explaining an example of the processing of the appearance of an enemy.

FIG. 10 is a flowchart describing an example of the processing of this appearing enemy. It is desirable that an enemy will not appear directly in the attacking zone, so that the variable n is first set to n=3 (S302*a*), and then the E[3] flag value is distinguished to determine whether or not there is an enemy at the first E[3] position in the waiting zone (S302*b*). If no enemy exists, E[3] of the flag arrangement is set to 1, the ID number is set to 3, and an enemy is made to appear (S302*c*). If an enemy exists at position E[3] (S302; No), n is increased by "1" to "4" in order to determine whether or not there is an enemy at the next position (S302*d*). In this case, n(=4) is not the maximum value MAX (S302*e*), so it is determined whether E[4] is "0" (S302*b*). If it is "0", the processing of setting up an enemy (causing an enemy to appear) (S302*c*) is performed, and if the enemy exists, the existence of an enemy in the next position is confirmed (S302*b*, S302*d*). This processing is repeated (S302*b* to S302*e*). When the enemy number MAX fixed in advance for each scene has been reached (S302*e*), the ID is set to "−1". If "−1" is set, it is set so that no enemies appear (S302*f*).

Figure 11:
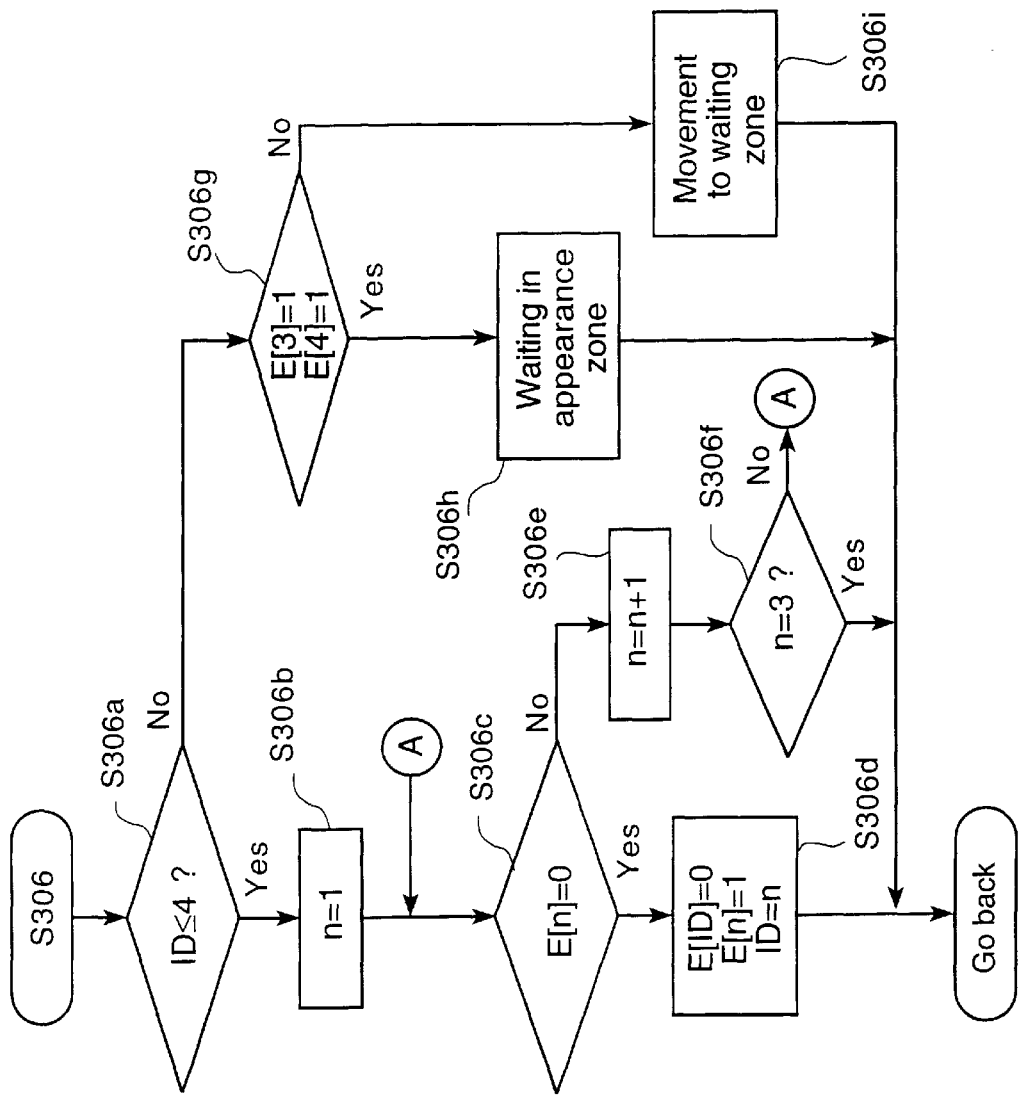
FIG. 11 is a flowchart explaining an example of the processing of a movement of the enemy towards the attacking zone and the waiting zone.

FIG. 11 is a flowchart for explaining an example of the movement processing of an enemy.

In order to determine whether or not the enemy will be transferred towards the camera, it must be distinguished first from the ID with a small number attached to such enemy. As shown in FIG. 7, if the enemy number in the waiting zone is set to 2, and that in the attacking zone to 2, it is determined whether the enemy ID is "4" or smaller (S306a). If "4" or smaller, it may proceed to the waiting zone or the attacking zone (S306a; Yes). The variable n is set to "1" (S306b), and it is determined whether arrangement E[1] is "0" or not (S306c). If "0", position E[1] of the attacking zone is vacant, and it is possible to proceed to this position (S306c; Yes). The CPU passes by the position E[ID] of the present sequence, and proceeds to E[n]. The ID of this enemy is changed to "1" (S306d).

If arrangement E[1] is "1", position E[1] of the attacking zone is not vacant. It is not possible to proceed to this position (S306c; No). It is determined whether the next position is vacant (S306e, S306f; No, S306c). If it is vacant, replacement is performed (S306d). If n becomes "3", there is no vacancy in the attacking zone (S306f; Yes), and it is determined at the next cycle whether there is vacancy in the waiting zone.

If the ID is "5" or greater, transfer to the waiting zone is possible (S306a; No). If both arrangements E(3) and E(4) are "1" (S306g; Yes), there is no vacancy in the waiting zone, so no movement can be performed. In this case, the enemy will wait in the appearing zone (S306h). If arrangements E(3) and E(4) are not both "1" (S306g; No), there is vacancy in the waiting zone. The same replacement processing will be performed for the same numbers as Step 306d, and the enemy will proceed to the waiting zone (S306i). As the enemy was moved, the ID sorting above (S308) is performed.

In this way, enemies with ID numbers 3 or 4 can move to the attacking zone, and those with ID numbers 5 or more can move to the waiting zone. After movement, the IDs of the enemies in the appearing zone are sorted (S308).

Figure 12:
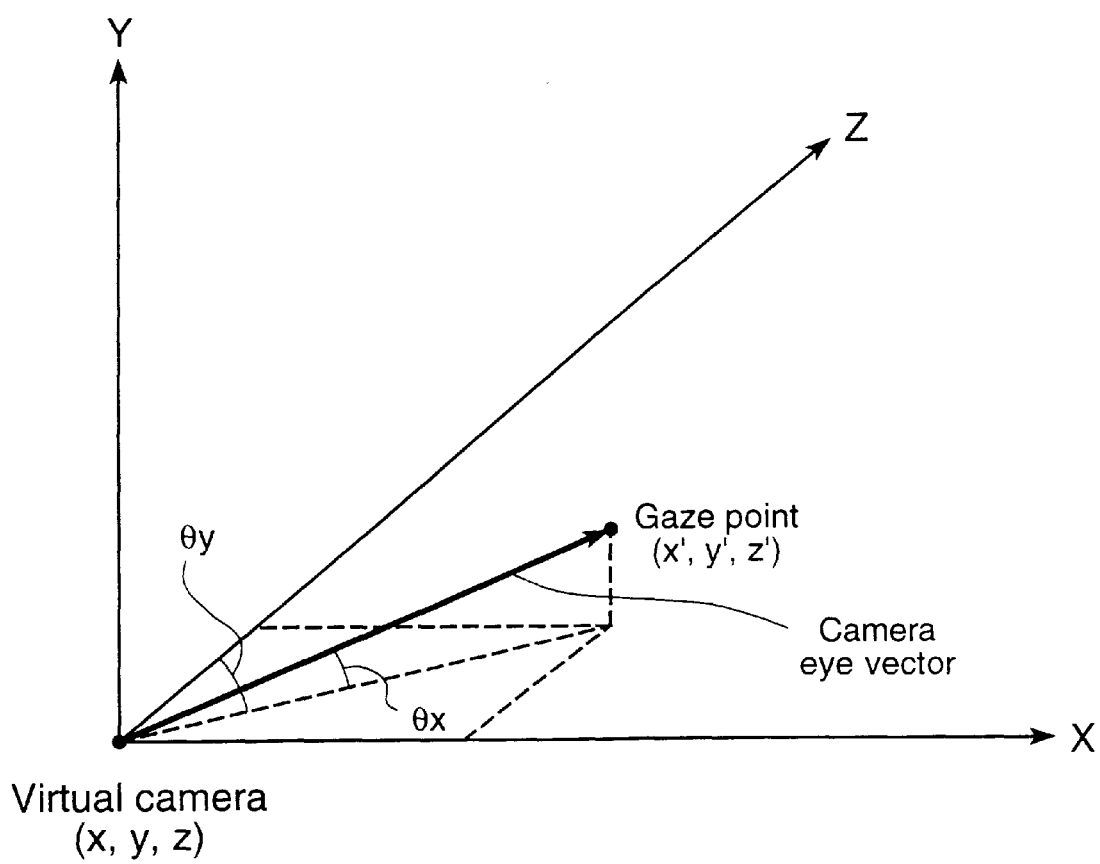
FIG. 12 is an explanatory view explaining the gaze point of the camera (viewpoint).

Furthermore, when the virtual camera moves inside the three-dimensional virtual space according to a program, the camera eye vector is set to a certain point (gaze point) inside the space, as shown in FIG. 12, and the picture is formed so that the gaze point will become the center of the display screen.

Figure 13:
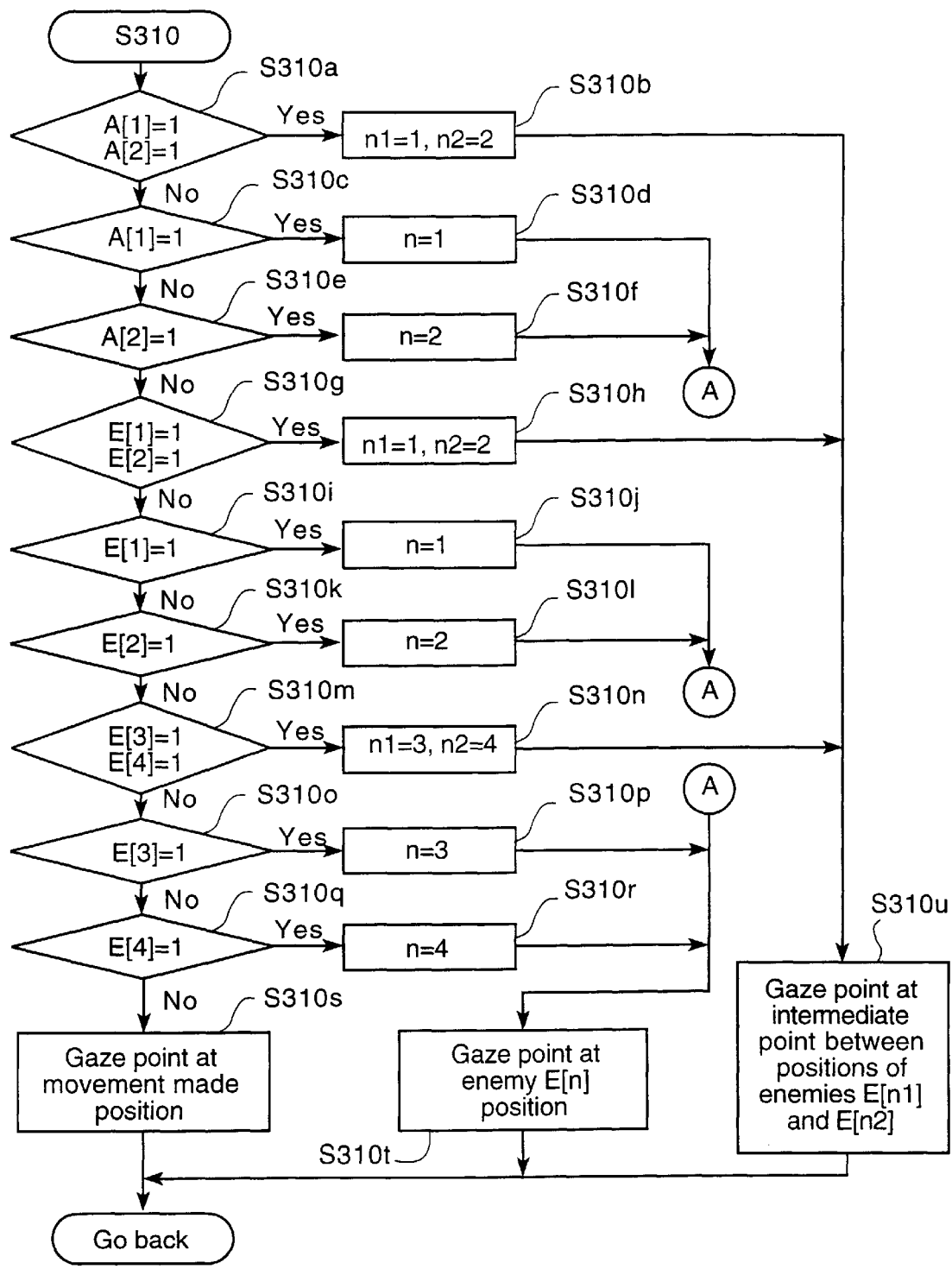
FIG. 13 is a flow chart explaining an example of the camera gaze point control.

FIG. 13 is a flowchart which explains one example of controlling the camera gaze point according to the state of the enemies in the direction of view of the virtual camera. This controlling act determines which enemy the virtual camera should gaze upon based on the distance between the virtual camera and the enemy character. Specifically, the enemy character which is nearer to, or which exists in the zone nearer to, the virtual camera is selected. Then, the position of the gaze point of the camera is set to the position of such selected enemy character or to the middle of a plurality of characters.

First, it is determined through the value of arrangement A[n] whether E1 and E2 in the attacking zone are trying to attack (S310a). If the two enemies are trying to attack at the same time (S310a; Yes), the gaze point of the camera is set at a position in the middle of the enemies E1 and E2 (S310b, S310u). If only enemy E1 is in an attacking state (S310c; Yes), the gaze point of the camera will be the position of enemy E1 (S310d, S310t). If only enemy E2 is in an attacking state (S310e; Yes), and the gaze point of the camera will be the position of enemy E2 (S310f, S310t). If both enemies E1 and E2 exist in the attacking zone but both are not in an attacking state (S310g), the gaze point of the camera will be an intermediate point between enemies E1 and E2 (S310h, S310u). If only enemy E1 exists in the attacking zone but is not in an attacking state (S310i), the gaze point of the camera will be the position of enemy E1 (S310j, S310t). If only enemy E2 exists inside the attacking zone but is not in an attacking state (S310k), the gaze point of the camera will be the position of enemy E2 (S310l, S310t). If no enemy exists inside the attacking zone (for example, if enemies E1 and E2 have been defeated), and enemies E3 and E4 exist inside the waiting zone (S310m), the camera gaze point is set to an intermediate point between enemies E3 and E4 (S310n, S310u). If there are no enemies in the attacking zone and only enemy E3 exists in the waiting zone (S310o), the camera gaze point is set to the position of enemy E3 (S310p, S310t). if no enemies exist in the attacking zone and only enemy E4 exists in the waiting zone (S310q), the gaze point of the camera is set to the position of enemy E4 (S310r, S310t).

If no enemies exist in the attacking zone and the waiting zone (S310q; No), the enemy in this case exists in the appearing zone and will not attack immediately, so the camera gaze point will be set to the camera position of such course which has been predetermined for the movement mode program (S310s).

In this way, the camera displays an attacking enemy with preference an the screen.

Furthermore, the camera determines the enemy to be gazed in correspondence with the distance between the camera and the enemy. Therefore, it is possible to direct the attention of the player to such enemy.

The camera directs its gate point to the enemy nearest to the camera. Accordingly, it is possible to inform the player which enemy is dangerous. On the other hand, if the gaze point of the player is intentionally directed to a distant enemy, it is possible to confuse the player and upgrade the difficulty level of the game.

Further, if two enemies are attacking, the camera eye vector (gaze point) is directed to an intermediate position between these two, and if only one of such enemies is attacked, the camera gaze point is directed towards such enemy. Therefore, the player is provided with an easily viewable screen during the shooting.

Furthermore, as described above, the stubbornness (strength) can be set for each enemy. A certain enemy can be set so that it will not be shot down without hitting it with many bullets. When performing control of the enemy such as in FIG. 13, control is performed so that the player confronts an enemy which bears down towards the camera even though it has been hit. Accordingly, the player will experience a sense of fear against the zombie which comes nearer and nearer without dying regardless of having been hit many times.

By performing control to follow an enemy which has not disappeared for a predetermined period of time (surviving enemies), it is possible to naturally move from a certain shooting scene to the next shooting scene.

Figure 14:
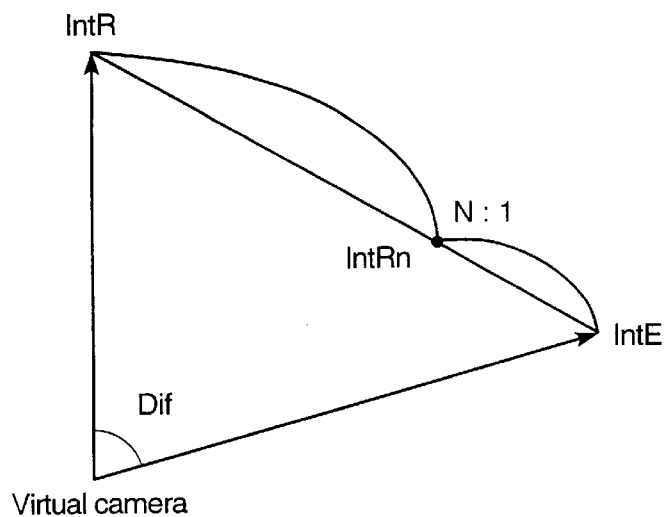
FIG. 14 is an explanatory view describing an example of the movement of the camera gaze point to the point of interior division.

Next, the improved control of the movement of the camera eye vector (gaze point) will be explained. When a plurality of enemies attack, it is desirable to shoot the enemy by focusing on the enemy movement, or by switching the gaze point. For example, when defeating a certain enemy, moving the gaze point of the virtual viewpoint (virtual camera) to another enemy to be shot down (for example, above-described S310m, etc.), or causing the camera to pursue one enemy. In other words, as shown in FIG. 14, the camera must be transferred from the present gaze point IntR to the energy gaze point IntE which is the gaze point of the enemy position to be set. If the movement of the viewpoint is performed rapidly during this process, the smooth process of the camerawork will be hindered. On the other hand, if the camera rotation is performed slowly, too much time is spent and an appropriate sense of speed of the game cannot be achieved.

Therefore, in accordance with the angle Dif formed by the present gaze point IntR and the target gaze point IntE (enemy gaze point) with virtual camera as vertex, the actual gaze point IntRn is set at the dividing point at the ratio N:1 an the line connecting such gaze points. Furthermore, the camera eye vector is transferred to the enemy gaze point by repeating the calculation of the new angle Dif between the transferred gaze point IntRn, which is set as the present gaze point, and the enemy gaze point, and thereby fixing point N. Therefore, the movement of the viewpoint (movement of the screen) becomes slow when the camera viewpoint nears the enemy gaze point.

This process and the control of the gaze point shown in the flowchart of FIG. 13 may be combined. If the gazed enemy dies, or any other change of the object to be gazed occurs under predetermined conditions, the speed of moving the camera eye vector is appropriately controlled it accordance with the distance between the present gaze point and the enemy to be gazed next.

The angle difference Dif in the virtual space is calculated by the following formula:

$$\text{Dif} = \cos^{-1}(VRx \cdot VEx + VRy \cdot VEy + VRz \cdot VEz)/((VRx^2 + VRy^2 + VRz^2)^{1/2} \cdot (VEx^2 + VEy^2 + VEz^2)^{1/2})$$

Assuming the gaze point IntRn which divides the line connecting gaze point IntR and gaze Point IntE at the ratio N:1 will have as its x, y, z coordinates IntRnx, IntRny, IntRnz, then the following formula can be effected.

$$IntRnx = (1/(1+N)) \cdot IntRx + (N/(1+N)) \cdot IntEx$$

$$IntRny = (1/(1-N)) \cdot IntRy + (N/(1+N)) \cdot IntEy$$

$$IntRnz = (1/(1+N)) \cdot IntRz + (N/(1+N)) \cdot IntEz$$

Here, Cam stands for the present camera position, Camx its x-coordinate, Camy its y-coordinate and Camz its z-coordinate. IntR is the present gaze point position, IntRx its x-coordinate, IntRy its y-coordinate, IntRz its z-coordinate. IntE is the enemy gaze point position, IntEX its x-coordinate, IntEy its y-coordinate, IntEz its z-coordinate. IntE is the enemy gaze point position, IntEx its x-coordinate, IntEy its y-coordinate, IntEz its z-coordinate.

Furthermore VRx=IntRx−Camx, VRy=IntRy−Camy, VRz=IntRz−Camz, VEx=IntEx−Camx, VEy=IntEy−Camy, and VEz=IntEz Camz.

Figure 15:
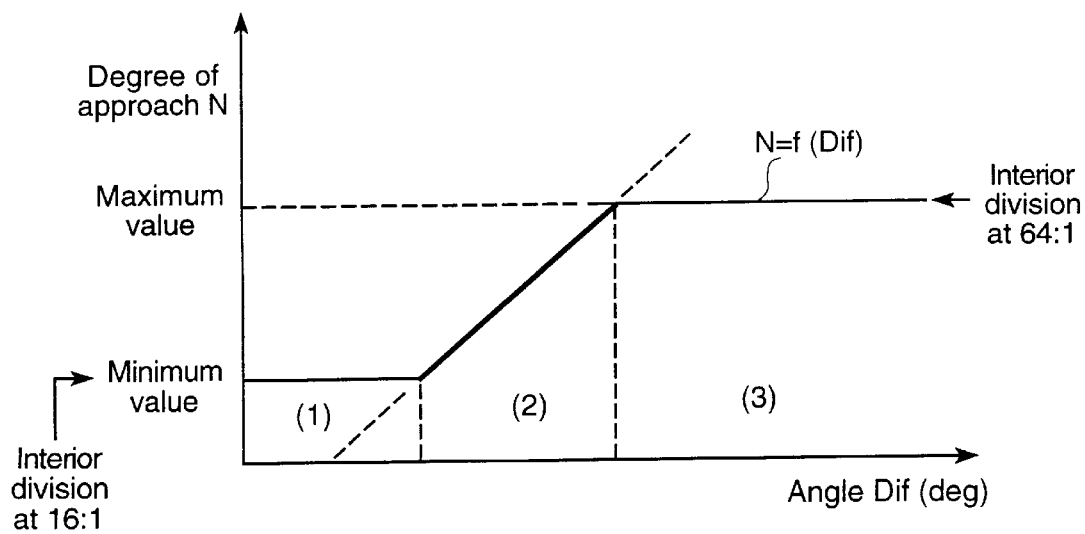
FIG. 15 is a graph explaining an exemplary function of the degree of approach N.

FIG. 15 shows an example of the dividing point N (degree of approach) set in relation with angle Dif.

In this figure, the variable of the degree of approach N is represented by N=F(Dif). In area (1), without setting a certain degree of approach, the camera eye vector cannot reach the enemy gaze point, so if angle Dif is relatively narrow, the degree of approach N is set to the minimum value. In area (2), the degree of approach N is set proportionally to angle Dif. In area (3), the degree of approach N is get to the maximum value. It the degree of approach N is too large, a smooth camerawork is hindered, so a maximum value of N is guaranteed.

By controlling the movement of the camera eye vector in this way, the true gaze point IntR will move smoothly even if the enemy gaze point XntE moves suddenly, and a smooth camerawork can be realized.

If the enemy gaze point IntE protrudes outside the screen (display area in the world coordinate system), it is possible to place the enemy inside the screen within a short period of time by increasing the degree of approach.

Furthermore, if the enemy gaze point IntE is relatively near the screen center, it is possible to prevent the enemy from coming further nearer to the screen center by decreasing the degree of approach.

The transfer of the camera gaze point for each dividing point may be performed in one frame or a plurality of frames. An example of the maximum value (64:1) and an example of the minimum value (16:1) of the dividing point are described in FIG. 15.

As described above, the game device according to the present invention allows a game proceeding according to the player's technical abilities by selecting the succeeding course in accordance with the game scores.

The game device according to the present invention also defines the appearance of characters and the number and strength of the characters in each zone, so that the difficulty grade of the game can be set easily.

The picture processing device according to the present invention forms the screen so that the character is positioned to be easily visible, so that the game can be played easily.

The picture processing device according to the present invention is preferable in that the gaze point of the virtual camera is made to smoothly follow the character movements.

We claim:

1. A picture processing device in which a virtual camera is directed towards a plurality of characters arranged inside a three-dimensional virtual space comprising at least one zone containing characters having an attack state preference, comprising:

first setting means for automatically setting a gaze point of said virtual camera preferentially to the character nearer to the virtual camera if only that character is in an attack state; and second setting means for automatically setting the gaze point to a position between two of these characters, if two characters exist with a same attack state preference.

2. A Medium for staring a program to cause a computer system to function as the picture processing device according to claim 1.

3. A picture processing device which controls the gaze point movement of a virtual camera arranged inside a three-dimensional virtual space of a game, the device comprising:

calculating means for calculating an angle of deviation formed by a present position of said gaze point in the three-dimensional virtual space of the game and a target position of said gaze point with the virtual camera position as a vertex arranged inside of said virtual space; and setting means for setting a next movement position of said gaze point corresponding to the value of said angle of deviation.

4. A picture processing device according to claim 3, wherein said next movement position is a dividing point an a line connecting said present position with said target position and said dividing point is set corresponding to said angle of deviation.

5. A picture processing device according to claim 3, wherein the succeeding distance of movement of said gaze point is determined by a function having said angle of deviation as its variable.

6. A picture processing device according to claim 5, wherein a maximum and minimum value have been set for the distance of movement of the gaze point of the virtual camera against said angle of deviation.

7. A medium for staring a program to cause a computer system to function as the picture processing device according to claim 3.

8. A game device configured to simulate fights between a player and one or more moving characters in a three-dimensional virtual space, the game device comprising:

moving means for moving a viewpoint inside the three-dimensional virtual space in which fights are simulated between the moving characters and the player inside the virtual space;

shooting means controllable by the player such that during a fight between the player and the moving character, the player can control the shooting means to shoot at the moving character;

eliminating means for eliminating a moving character from the moving characters to be attacked by the player if the moving character has been attacked by the player for at least a predetermined number of attacks;

storing means configured to store multiple movement courses of the view point which branch off from a certain scene in said three-dimensional virtual space together with the conditions for such branch-off;

multiple movement courses of the view point which branch off from a certain scene in the three-dimensional virtual space together with the conditions for such branch-off, wherein the movement courses are stored by the storing means;

picture processing means for performing data processing to form pictures corresponding to the operation signals from an operating means, and for performing picture conversion to form an image viewed from said viewpoint; and course selecting means for selecting a predetermined movement course corresponding to said moving characters which have not been considered to be dead from among the multiple viewpoint movement courses, and for moving said viewpoint along a selected movement course.

9. A medium for storing a program to cause a computer system to function as the gang device according to claim 8.

10. A game device comprising:

displaying means for displaying objects placed in a three-dimensional virtual space as object pictures captured from a certain virtual camera in the virtual space;

shooting means for shooting the object pictures;

gaze object determining means for determining the object to be gazed by said virtual camera based on the distances between said virtual camera and each of said objects; and gaze point setting means for automatically setting the gaze point of said virtual camera upon the determined object.

11. A game device according to claim 10, characterized in that said gaze object determining means selects the object nearest in distance from said virtual camera.

12. A game device according to claim 10, further comprising movement controlling means for controlling the movement mode of the gaze point of said virtual camera in correspondence with the distance between the present virtual camera gaze point and said determined object during the movement of said virtual camera gaze point.

13. A medium for storing a program to cause a computer system to function as the game device according to claim 10.

14. A game device for playing a game under movement of a viewpoint arranged in a three-dimensional virtual space, comprising:

game score setting means for setting a game score of the player based on the player's ability to fight one or more enemy characters;

storing means configured to store multiple movement courses of the viewpoint which branch off from a certain scene in said three-dimensional virtual space, together with the conditions for such branch-off;

multiple movement courses of the view point which branch off from a certain scene in the three-dimensional virtual space together with the conditions for such branch-off, wherein the movement courses are stored by the storing means;

picture processing means for performing data processing to form pictures corresponding to the operation signals from an operating means, and for performing picture conversion to form the image viewed from said viewpoint; and course selecting means for selecting a movement course corresponding to the game scores from among said multiple viewpoint movement courses, and for moving said viewpoint along the selected movement course.

15. A medium for storing a program to cause a computer system to function as the game device according to claim 14.

16. A game device configured to simulate fights between a player and one or more moving characters in a three-dimensional virtual space, the game device comprising:

moving means for moving a viewpoint inside the three-dimensional virtual space in which fights are simulated between the moving characters and the player inside the virtual space;

shooting means controllable by the player such that during a fight between the player and the moving character, the player can control the shooting means to simulate shooting at the moving character;

eliminating means for eliminating a moving character from the moving characters to be attacked by the player if the moving character has been attacked by the player for at least a predetermined number of attacks;

storing means configured to store multiple movement courses of the viewpoint which branch off from a certain scene in said three-dimensional virtual space, together with the conditions for such branch-off;

multiple movement courses of the view point which branch off from a certain scene in the three-dimensional virtual space together with the conditions for such branch-off, wherein the movement courses are stored by the storing means;

picture processing means for performing data processing to form pictures corresponding to the operation signals from an operating means, and for performing picture conversion to form the image viewed from said viewpoint; and course selecting means configured to calculate the strength level of the characters simulated dead within a predetermined period of time as the game score, to select a movement course corresponding to the game scores from among said multiple viewpoint movement courses, and to move said viewpoint along the selected movement course.

17. A game device according to claim 16, further comprising multiple zoning of said three-dimensional virtual space, arranging a plurality of said characters among said multiple zones, and defining the strength of each character in each zone with regard, to the degree of resistance against said shooting.

18. A game device according to claim 17, further comprising causing a character to appear with preference in zones further away from the viewpoint among said multiple zones.

19. A game device according to claim 17, wherein the character number to be arranged in each zone is limited.

20. A medium for storing a program to cause a computer system to function as the game device according to claim 16.

21. A picture processing device for moving a virtual camera inside a three-dimensional virtual space in a game, comprising:

a zone delineating means for delineating into multiple zones, on the basis of proximity to the virtual camera an area in which said player and said plurality of enemy characters fight; and limiting means for limiting the number of enemy characters which may exist inside a zone nearest to said virtual space, wherein the game comprises multiple movable enemy characters configured to fight the player, and the player fights the enemy characters in the zone nearest to the virtual camera.

22. A medium for staring a program to cause a computer system to function as the game device according to claim 21.

23. A game device comprising:

a plurality of enemy characters, each enemy character having a strength defined with regard to a degree of resistance against an attack;

a virtual camera configured to move inside a three-dimensional virtual space in which fights between the plurality of movable enemy characters and a player are simulated;

attacking means controllable by the player such that during a fight between the player and the enemy character, the player can control the attacking means to simulate attacking against the enemy character;

eliminating means for eliminating an attacked enemy character from the enemy characters to be attacked by the player if the enemy character has been attacked by the player for at least a predetermined number of attacks; and controlling means for controlling the movement of a gaze point of said virtual camera to follow said enemy character which has not been considered to be dead in spite of said attacks.

24. A medium for storing a program to cause a computer system to function as the game device according to claim 23.

25. A game device comprising:

a plurality of movable enemy characters each of which has a strength defined with regard to a degree of resistance against an attack;

a virtual camera configured to move inside a three-dimensional virtual space in which fights between the plurality of movable enemy characters and a player are simulated;

attacking means controllable by the payer such that during a fight between the player and the enemy character, the player can control the attacking means to simulate attacking against the enemy character;

eliminating means for eliminating an attacked enemy character from the enemy characters to be attacked by the player if the enemy character has been attacked by the player for at least a predetermined number of attacks; and character movement controlling means for moving said enemy character that has not been considered to be dead in spite of said attacks to move towards said virtual camera.

26. A medium for storing a program to cause a computer system to function as the game device according to claim 25.

* * * * *